2,736,733

HYDROCORTISONE TERTIARY-BUTYLACETATE AND PROCESSES FOR PREPARING THE SAME

Edward F. Rogers, Middletown, N. J., and John P. Conbere, Cranston, R. I., assignors to Merck & Co., Inc., Rahway, N. J., a corporation of New Jersey No Drawing. Application January 27, 1954,
Serial No. 406,586

3 Claims. (Cl. 260—397.45)

This invention is concerned with a novel ester of hydrocortisone (17-hydroxycorticosterone), compositions containing this novel ester, and methods of preparing this ester.

Hydrocortisone acetate has been found to be of particular value in the treatment of rheumatoid or osteoarthritic joints. Thus, injections of suspensions or solutions of hydrocortisone acetate into the articular cavity of a rheumatic joint results in a significant improvement in the inflamed joint within 24 hours following intraarticular injection. This improvement consists of a decrease in swelling and tenderness as well as increased range of motion. The clinical improvement noted after the injection of hydrocortisone acetate varies from case to case of rheumatoid arthritis but usually persists for from three to twenty-one days, while the subjective improvement in pain and stiffness of the joint may last even longer. While the treatment with hydrocortisone acetate is of great value in providing relief of the painful symptoms of rheumatoid joints, it suffers from the disadvantage that it must be repeated at more or less frequent intervals.

It is an object of the present invention to provide a novel ester of hydrocortisone which upon injection of the articular cavity will provide a prolonged effect. A further object is to provide a method of preparing this hydrocortisone ester. Another object is to provide novel pharmaceutical compositions containing this ester. Other objects will be apparent from the detailed description hereinafter provided.

In accordance with the present invention, it is now found that hydrocortisone tertiary butyl acetate of the formula

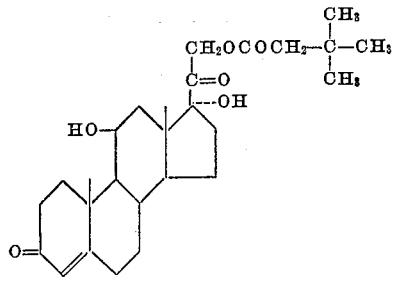

possesses unexpected properties which make it of outstanding value in the treatment of rheumatoid joints. Thus, this particular ester of hydrocortisone is unique in its action when compared with other esters of hydrocortisone. For example, it has been determined from extensive clinical trials that injection of suspensions containing tertiary butyl acetate results in the relief of symptoms which is one and one-half to two times greater than with hydrocortisone acetate. Further, hydrocortisone tertiary butyl acetate administered intraarticularly is effective two to three times longer than hydrocortisone acetate. Accordingly, these unexpected properties of the tertiary butyl acetate make it very valuable in the treatment of rheumatoid joints.

Our novel hydrocortisone ester can be prepared by reacting tertiary butyl acetyl chloride with hydrocortisone in the presence of a base. This is conveniently accomplished by adding tertiary butyl acetyl chloride to a cold solution of hydrocortisone in a mixture of chloroform and pyridine, allowing the mixture to stand in the cold until the conversion of hydrocortisone to the ester is complete, adding water to the resulting reaction mixture and extracting the product from the mixture with chloroform. After evaporation of the chloroform solution under diminished pressure the hydrocortisone tertiary butyl acetate is obtained in the form of an oil which may be further purified by recrystallization from ethyl alcohol.

In accordance with another embodiment of our invention, there are provided novel pharmaceutical preparations containing hydrocortisone tertiary butyl acetate. Compositions comprising suspensions of hydrocortisone tertiary butyl acetate in suitable pharmaceutical vehicles or carriers can be prepared in accordance with methods well-known in the art. Alternatively, these suspensions may contain other esters of hydrocortisone or hydrocortisone alcohol in addition to the tertiary butyl acetate ester. Thus, a suspension of a mixture of the acetate and the tertiary butyl acetate esters of hydrocortisone has been found to be most satisfactory in providing a pharmaceutical preparation which is very effective in the treatment of rheumatic joints. Such suspensions act promptly in relieving the inflamed condition of rheumatic joints and provide a prolonged relief of the symptoms.

The following example illustrative of the several embodiments of our invention will provide a more complete understanding of this invention:

EXAMPLE 1

Hydrocortisone tertiary butyl acetate

A solution of tertiary butyl acetyl chloride in 85 ml. of dry chloroform was added portion-wise to an ice-cooled solution of 50 gms. of hydrocortisone in 250 ml. of anhydrous pyridine. The resulting reaction mixture was allowed to stand overnight in a refrigerator. The solution was then poured into 1500 ml. of water and the resulting aqueous mixture extracted with four 500 ml. portions of chloroform. The combined chloroform layers were washed with water, dilute hydrochloric acid (until all the pyridine was removed), water 5% aqueous sodium bicarbonate and finally with water. After drying the chloroform extract over magnesium sulfate, the chloroform was evaporated under diminished pressure. The residual oil so obtained was crystallized and recrystallized from ethanol to yield crystalline hydrocortisone tertiary butyl acetate, melting point 168–169° C. A second crop can be obtained by concentration of the filtrate. The material is dimorphic, its other form melting at 229–230° C. $[\alpha]_D^{25}+152°$ C. (C, 1, CHCl$_3$);

$$E_{1\%}^{1cm.}\ 372$$

at λ max. 242 nμ (methanol).

Calcd. for $C_{27}H_{40}O_6(460.59)$: C, 70.41; H, 8.75.
Found: C, 70.48; H, 8.38.

The tertiary butyl acetyl chloride employed above was prepared by adding teritary butyl acetic acid portion-wise to thionyl chloride with cooling. The resulting reaction mixture was heated on a steam bath for 90 minutes and then distilled under diminished pressure to give a quantitative yield of tertiary butyl acetyl chloride, boiling point 75° C./145 mm.

EXAMPLE 2

*Suspension of hydrocortisone t-butyl acetate in aqueous vehicle*

A sterile saline suspension of hydrocortisone t-butyl acetate containing

| | |
|---|---|
| Tween 80 (polyoxyalkylene derivative of sorbitane monooleate)_____g__ | 12 |
| Sodium chloride_____g__ | 27 |
| Sodium carboxymethyl cellulose_____g__ | 15 |
| Benzyl alcohol_____g__ | 27 |
| Hydrocortisone t-butyl acetate_____g__ | 75 |

Distilled water to make 3,000 cc. was prepared in the following manner:

A sterile aqueous vehicle containing the Tween 80, sodium chloride, sodium carboxymethyl cellulose, benzyl alcohol and the water and the sterile hydrocortisone t-butyl acetate were added to a sterile Pyrex glass bottle approximately one-third full of solid sterile Pyrex glass beads. The bottle was then aseptically sealed and was rolled on its side for a period of about 18 hours after which the milled mixture was aseptically separated from the beads by draining on a perforated plate of a sterile Buchner funnel.

The resulting sterile suspension of hydrocortisone t-butyl acetate is suitable for parenteral injection, for example, into the articular cavity of a rheumatic joint.

In the same manner, suspensions of mixtures of hydrocortisone acetate and hydrocortisone t-butyl acetate may be prepared in which a portion of the t-butyl acetate ester is replaced by an equivalent amount of the acetate ester. Such suspensions can also be utilized for parenteral injection.

EXAMPLE 3

*Ophthalmic suspension of hydrocortisone t-butyl acetate*

A 2.5% ophthalmic suspension of hydrocortisone t-butyl acetate was prepared using the glass-bead wet milling technique described in Example 2. This suspension contained

| | |
|---|---|
| Hydrocortisone t-butyl acetate_____g__ | 40 |
| Tween 80_____g__ | 0.320 |
| Zepheran Chloride (a 12.8% solution of high molecular weight alkyl-dimethyl benzyl ammonium chlorides) _____cc__ | 2.6 |
| NaH$_2$PO$_4$.H$_2$O _____g__ | 7.2 |
| Na$_2$HPO$_4$—anhydrous _____g__ | 7.5 |
| Sodium chloride_____g__ | 7.7 |
| Sodium citrate .2H$_2$O_____g__ | 1.6 |
| Benzyl alcohol_____g__ | 8.0 |
| Carbowax 4000 (solid polyethylene glycol)___g__ | 160.0 |
| Water to make 1600 cc. | |

By aseptically diluting the 2.5% suspension shown above with the required amount of aqueous vehicle, a 0.5% ophthalmic suspension can be prepared.

EXAMPLE 4

*1.5% ophthalmic ointment containing hydrocortisone t-butyl acetate*

| | |
|---|---|
| Hydrocortisone t-butyl acetate, sterile, freeze dried_____ | 21 g. |
| Kaydol BT-90 (heat resistant liquid petrolatum)_____ | 1 part to make 1400 g. |
| White Fonoline (heat resistant petrolatum) _____ | 3 parts. |

The ointment was prepared by incorporating the sterilized mixed petroleum bases with the previously pulverized hydrocortisone ester until a homogeneous mixture was obtained.

EXAMPLE 5

*1% and 2.5% topical ointments containing hydrocortisone t-butyl acetate*

| Composition | 1% | 2.5% |
|---|---|---|
| | Gm. | Gm. |
| Hydrocortisone-t-butyl acetate_____ | 0.0100 | 0.0250 |
| Zinc stearate_____ | 0.0780 | 0.0630 |
| Propylene Glycol_____ | 0.3070 | 0.3070 |
| Carbowax 1500 (polyethylene glycol)_____ | 0.3800 | 0.3800 |
| Carbowax 4000 (polyethylene glycol)_____ | 0.1800 | 0.1800 |
| Distilled water_____ | 0.0450 | 0.0450 |
| | 1.0000 | 1.0000 |

A slurry of the hydrocortisone t-butyl acetate and zinc stearate in the propylene glycol and water was added to the melted carbowaxes. The resulting mixture was blended on a roller mill to a smooth uniform ointment and then subdivided into jars or tubes.

Although the concentration of the active ingredient in the novel pharmaceutical preparations may be varied within wide limits, it is preferred to employ the hydrocortisone ester in an amount ranging from about 0.1% to about 25% by weight of the composition depending on the particular pharmaceutical vehicle and the use intended. Vehicles containing from about 1% to about 5% of the active ingredient have been found to be particularly satisfactory.

Various changes and modifications in the procedures herein disclosed will occur to those skilled in the art, and to the extent that such changes and modifications are embraced by the appended claims, it is to be understood that they constitute part of our invention.

We claim:
1. Hydrocortisone tertiary butyl acetate.
2. A composition consisting of a suspension of hydrocortisone tertiary butyl acetate in a pharmaceutical carrier.
3. A composition consisting of a suspension of hydrocortisone tertiary butyl acetate in an aqueous pharmaceutical carrier.

References Cited in the file of this patent

UNITED STATES PATENTS

| 2,183,589 | Reichstein | Dec. 19, 1939 |
| 2,316,142 | Cartland | Apr. 6, 1943 |

OTHER REFERENCES

Boland: JAPA (Pract. Ed.), vol. 13, No. 8, Aug. 1952, pp. 540–44.